United States Patent
Tan et al.

(10) Patent No.: US 7,982,326 B2
(45) Date of Patent: Jul. 19, 2011

(54) SYSTEM AND METHOD FOR CONTROLLING TORQUE RIPPLES IN SYNCHRONOUS MACHINES

(75) Inventors: Zhuohui Tan, Shanghai (CN); Xiaoming Yuan, Shanghai (CN); Changyong Wang, Shanghai (CN); Ronghai Qu, Clifton Park, NY (US); Robert William Delmerico, Clifton Park, NY (US); Patrick Lee Jansen, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/899,918

(22) Filed: Oct. 7, 2010

(65) Prior Publication Data

US 2011/0018281 A1 Jan. 27, 2011

Related U.S. Application Data

(62) Division of application No. 11/863,352, filed on Sep. 28, 2007, now Pat. No. 7,847,526.

(51) Int. Cl.
*F03D 9/00* (2006.01)
(52) U.S. Cl. .................................... 290/44; 322/44
(58) Field of Classification Search .............. 322/46, 322/59, 44, 19, 29; 363/40; 361/76; 290/44, 290/55; 416/1
See application file for complete search history.

(56) References Cited

U.S. PATENT DOCUMENTS

| | | | | |
|---|---|---|---|---|
| 4,800,478 A * | 1/1989 | Takahashi | | 363/41 |
| 5,225,712 A * | 7/1993 | Erdman | | 290/44 |
| 5,798,632 A * | 8/1998 | Muljadi | | 322/29 |
| 7,504,738 B2 * | 3/2009 | Barton et al. | | 290/44 |
| 2004/0174720 A1 * | 9/2004 | Kurokami et al. | | 363/16 |
| 2006/0132993 A1 * | 6/2006 | Delmerico et al. | | 361/20 |
| 2006/0214429 A1 * | 9/2006 | Kikuchi et al. | | 290/44 |
| 2007/0120369 A1 * | 5/2007 | Delmerico et al. | | 290/44 |
| 2007/0121353 A1 * | 5/2007 | Zhang et al. | | 363/39 |
| 2007/0177314 A1 * | 8/2007 | Weng et al. | | 361/20 |
| 2008/0001411 A1 * | 1/2008 | Ichinose et al. | | 290/55 |

FOREIGN PATENT DOCUMENTS

JP 2004064909 A * 2/2004

* cited by examiner

*Primary Examiner* — Julio Gonzalez
(74) *Attorney, Agent, or Firm* — Ann M. Agosti (57) ABSTRACT

A system for controlling torque ripple in a permanent magnet synchronous machine includes a power converter configured to be coupled to the permanent magnet synchronous machine and to receive converter control signals and a system controller coupled to the power converter. The system controller includes a fundamental current controller configured for providing fundamental voltage commands, a harmonic current controller configured for using harmonic current commands, current feedback signals from the permanent magnet machine, and fundamental current commands in combination with positive and negative sequence regulators to obtain harmonic voltage commands, and summation elements configured for adding the fundamental voltage commands and the harmonic voltage commands to obtain the converter control signals.

7 Claims, 6 Drawing Sheets

SYSTEM AND METHOD FOR CONTROLLING TORQUE RIPPLES IN SYNCHRONOUS MACHINES

CROSS REFERENCE TO RELATED APPLICATIONS

This application is a divisional of U.S. patent application Ser. No. 11/863,352, entitled "SYSTEM AND METHOD FOR CONTROLLING TORQUE RIPPLES IN SYNCHRONOUS MACHINES," filed 28 Sep. 2007, which is herein incorporated by reference.

BACKGROUND

The subject matter disclosed herein relates generally to the field of permanent magnet synchronous machines and more specifically to a system and method for controlling torque ripples in permanent magnet synchronous machines.

Wind turbine generators are regarded as environmentally friendly and relatively inexpensive alternative sources of energy that utilize wind energy to produce electrical power. A wind turbine generator generally includes a wind rotor having turbine blades that transform wind energy into rotational motion of a drive shaft, which in turn is utilized to drive a rotor of an electrical generator to produce electrical power. Modern wind power generation systems typically take the form of a wind-farm having multiple such wind turbine generators that are operable to supply power to a transmission system that in turn provides the power to a utility system.

These wind turbine generators and wind-farms are typically designed to deliver power to the utility system with the power being independent of system frequency. Some wind turbine generators have a variable frequency operation and require a variable frequency power electronic converter to interface the wind turbine generator output with the utility grid. In one common approach, the wind turbine generator output is directly fed to a power electronic converter where the generator output frequency is rectified and inverted into a fixed frequency as needed by the utility system.

One of the challenges associated with such systems is the amount of acoustic noise produced by the generator. Further, the effect of wind turbine airgap torque ripple on acoustic noise has been largely overlooked. Torque ripple limits are based on managing the noise behavior of the turbine system and avoiding detrimental effects of drive train components. One approach is to design the generator appropriately to reduce the acoustic noise but that has limitations related to increased generator size and cost. It is a challenge to design a cost-effective generator with very low acoustic noise level. Acoustic noise control and therefore the torque ripple control is even a greater challenge for high power applications due to low switching frequency of devices in such applications.

BRIEF DESCRIPTION

Briefly, in one embodiment disclosed herein, a system for controlling torque ripple in a permanent magnet synchronous machine comprises: (a) a power converter configured to be coupled to the permanent magnet synchronous machine and to receive converter control signals; and (b) a system controller coupled to the power converter, the system controller comprising: (i) a fundamental current controller configured for providing fundamental voltage commands, (ii) a harmonic current controller configured for using harmonic current commands, current feedback signals from the permanent magnet machine, and fundamental current commands in combination with positive and negative sequence regulators to obtain harmonic voltage commands, and (iii) summation elements configured for adding the fundamental voltage commands and the harmonic voltage commands to obtain the converter control signals.

In accordance with another embodiment disclosed herein a system for controlling torque ripple in a permanent magnet synchronous generator comprises a power converter configured to be coupled to the permanent magnet synchronous generator and to receive converter control signals; and a system controller coupled to the power converter, the system controller comprising: a fundamental current controller configured for providing a fundamental current command; a harmonic current controller for providing positive and negative sequence signals using a harmonic current command; and a command control block configured for using the fundamental current command, the harmonic current command, a current feedback signal from the permanent magnet synchronous generator, and the positive and negative sequence signals to provide the converter control signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Wind turbines generate sound via various routes, both mechanical and aerodynamic. Mechanical sounds arise from the interaction of turbine components such as gearboxes, generators, yaw drives, cooling fans, hydraulics, and auxiliary components. Aerodynamic sounds are produced by the flow of air over the blades. The various embodiments described herein address acoustic sound due to generator operation. The torque ripples generated during the generator operation have an impact on the acoustic noise. The embodiments described herein provide different control schemes to reduce the impact of torque ripples and thereby reduce the acoustic noise.

Figure 1:
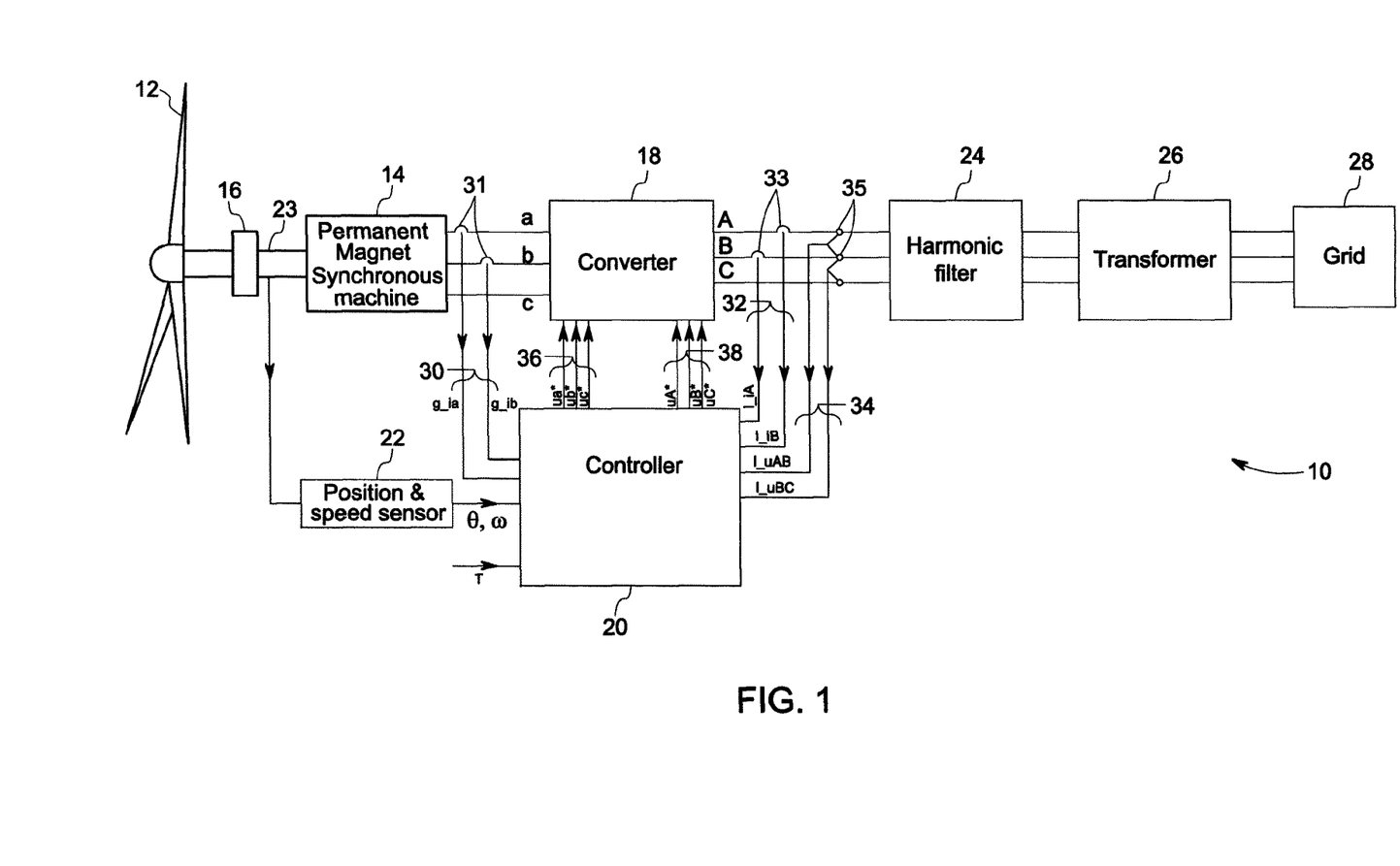
FIG. 1 is a diagrammatic representation of a wind turbine system in accordance with an exemplary embodiment.

FIG. 1 is a block diagram of a wind turbine system 10 having blades 12 that are coupled to a permanent magnet synchronous machine depicted as a generator 14. Such coupling may either be a direct coupling or via an optional gear box 16. The generator 14 via its stator (not shown) is coupled to a power converter 18 that takes the electricity from the generator's stator (not shown) and converts the electricity into appropriate form for delivery to the grid 28. The power converter 18 in the exemplary embodiment is an AC-DC-AC converter, but other types of converters may alternatively be employed. The power converter 18 includes switching devices (such as insulated gate bipolar transistors, not shown) that are turned on and off in response to commands from a system controller 20. As will be understood by those skilled in the art, power converter 18 may optionally comprise further control to convert voltage commands from system controller into switch signals. Alternatively, these functions maybe physically done in the system controller 20 such that switch commands would be sent to converter 18 instead of voltage commands. A harmonic filter 24 is coupled on the output side to the power converter 18. The harmonic filter in turn is coupled to a transformer 26 that is finally linked to the grid 28.

A position and speed sensor 22 (which may be separate from or included within the system controller 20) feeds the position θ and speed ω values from the shaft 23 coupled to the generator 14 into the system controller 20. The system controller 20 receives current signals 30, 32 from the current sensors 31, 33 respectively at the input and output terminals of the power converter 18 and voltage signals 34 from the output nodes 35 of the power converter 18. The system controller 20 also receives a torque command signal T from a turbine controller (not shown). From the torque command, the harmonic current commands are calculated as described below. The system controller 20 generates operating voltage commands 36, ua*, ub*, uc* and line side voltage commands 38, uA*, uB*, uC* that are used to inject power to the grid via the power converter 18. Additionally the system controller 20 includes a harmonic current controller (as shown and described below in FIG. 3) for controlling positive and negative sequence harmonic current for minimizing torque ripples in the generator.

Figure 2:
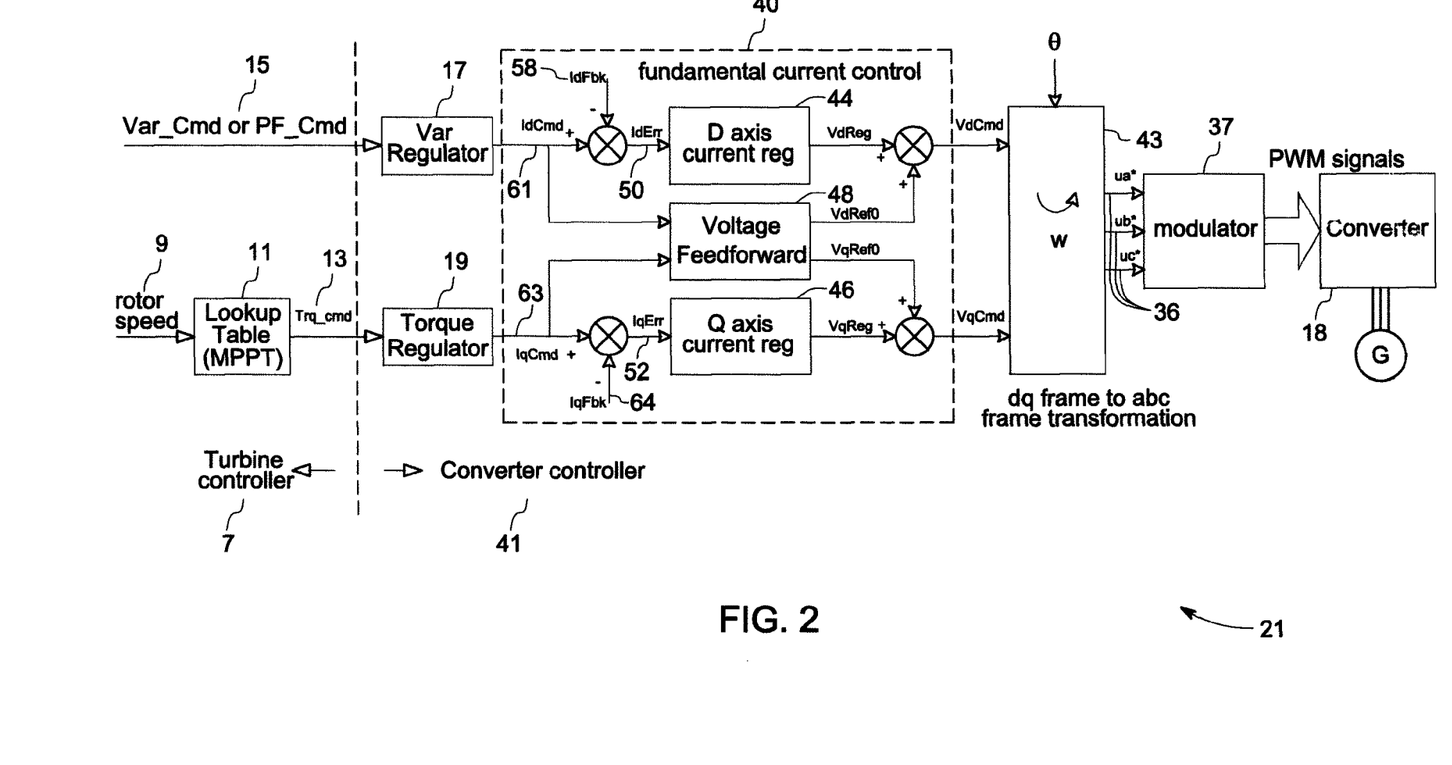
FIG. 2 is a diagrammatic representation of a conventional control diagram for a wind turbine generator.

FIG. 2 illustrates a conventional control diagram 21 for a wind turbine generator 14. A turbine controller 7 receives a rotor speed signal 9 from a rotor speed sensor (for example position and speed sensor 22 of FIG. 1) and generates a torque command 13 via a predetermined lookup table 11 such as a Maximum Power Point Tracking (MPPT) lookup table. Converter controller 41 receives a Var (reactive power) command or a Power factor (PF) command 15 and the torque command 13 from the turbine controller 7. A Var regulator 17 and a torque regulator 19 are introduced to regulate reactive power and electro-magnetic torque and to generate current commands IdCmd 61 and IqCmd 63 in a rotational frame. Close-loop regulators 44 and 46 in D, Q axes respectively are used to control the errors IdErr 50 and IqErr 52 between current commands IdCmd and IqCmd and generator currents IdFbk 58 and IqFbk 64 to be zero. A voltage feedforward signal 48 can be introduced to increase dynamic response. The summation of the voltage feedforward signal and the current regulator outputs in d, q axes respectively yield voltage commands VdCmd and VqCmd. VdCmd, VqCmd are transformed in a dq frame to abc frame transformation block 43 to stationary frame voltage commands 36, ua*, ub*, uc*. Converter voltage commands 36, ua*, ub*, uc* are modulated in a modulator 37 to generate PWM (pulse width modulated) signals (on/off states) for driving generator side converter 18.

In this conventional diagram as described in FIG. 2, the generator model is usually an ideal one without considering manufacturing realities such as eccentricity, non-sinusoidal distribution of the stator winding, saturation, and non-identity in permanent magnet material. Rotating reference frames are often used to convert conventional sinusoidal current components into DC current components, and harmonic effects are usually ignored in such calculations.

In contrast to conventional approaches, in embodiments disclosed herein, to minimize acoustic noise from torque ripples, the harmonic currents are used as additional inputs for providing a closed loop control. The current command for torque ripple minimization may be calculated using, for example, generator finite element analysis calculation, an outer torque control loop, or on-line calculations. The multiple rotating frames in the D axis and Q axis may be used to transform errors at specific frequencies to DC errors at the corresponding frequencies. Thus the integrators in the corresponding frequency rotating frames can control the errors of harmonic currents to zero. Both the positive sequence and negative sequence rotating frame integrators (as described below) are used in order to reduce torque ripple and acoustic noise.

Figure 3:
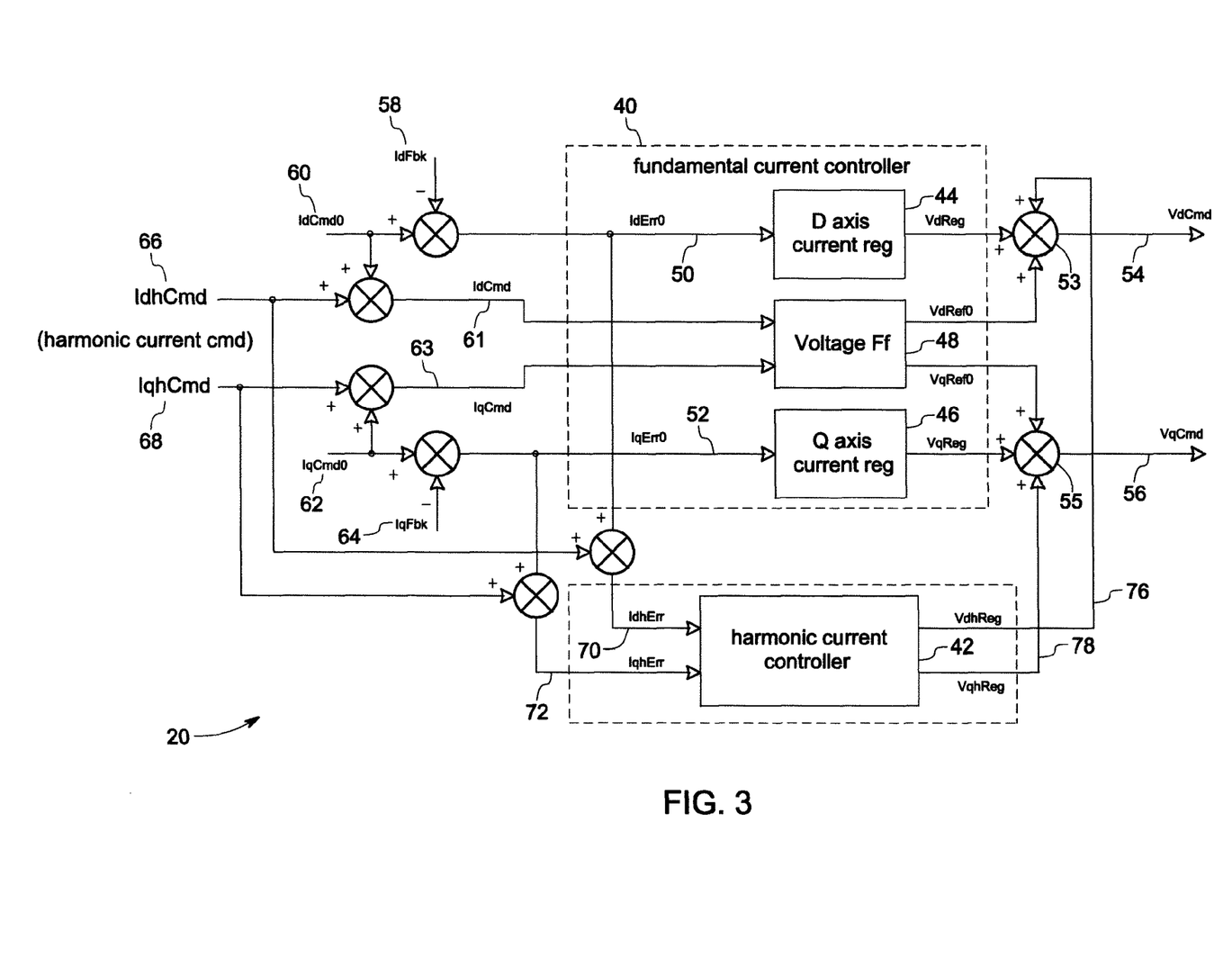
FIG. 3 is a diagrammatic representation of an exemplary controller employed in the wind turbine system of FIG. 1.

FIG. 3 illustrates an exemplary implementation of the system controller 20 that provides for non-ideal conditions of the generator operation. The exemplary system controller 20 includes a fundamental current controller 40 and a harmonic current controller 42. An exemplary control scheme includes two closed loop channels 44, 46 with a feed-forward channel 48 (implemented as fundamental current controller) and one or more closed loop control channels 42 (implemented as one or more harmonic current controllers).

The fundamental current controller 40 functions as a conventional current controller as explained in reference to FIG. 2 and includes D axis and Q axis current regulators 44, 46 that use the respective D axis and Q axis error signals Iderr0 50 and Iqerr0 52 along with the voltage feed-forward block 48 (voltage feedforward receives inputs in the form of IdCmd 61 and IqCmd 63, which are the summation of harmonic current commands and fundamental current commands in D and Q axes respectively) to generate the D axis and Q axis command voltages VdCmd 54 and VqCmd 56. Fundamental current command IdCmd0 60 and feedback current signal IdFbk 58 are summed to generate the IdErr0 signal 50 that feeds into the D axis current regulator 44. Similarly fundamental current command IqCmd0 62 and feedback current signal IqFbk 64 are summed to generate the IqErr0 signal 52 that feeds into the Q axis current regulator 46.

The harmonic current commands 66 and 68 are added to the fundamental current commands, and the feedback current signals are subtracted from that sum. The resulting error signals IdhErr 70 and IqhErr 72 are reduced to zero using harmonic current controller 42 which in turn provides voltage commands VdhReg 76 and Vqhreg 78. The voltage commands are summed with the respective D axis and Q axis voltage outputs of fundamental current controller 40 to provide the final voltage commands VdCmd 54 and VqCmd 56.

The harmonic current controller 42 is advantageously used to provide a closed loop current control. The fundamental current controller 40 and the harmonic current controller 42 together form a command control block configured for using the fundamental current command, the harmonic current command, a current feedback signal from the permanent magnet synchronous generator, and the positive and negative sequence signals to provide the converter control signals.

The discussion below provides the theoretical basis for using the harmonic components in order to reduce torque ripple and acoustic noise of a wind turbine generator.

The generator electro-magnetic torque can be expressed conventionally as below, $$T_{em} = \frac{3}{2}n_p(\psi_{pm}i_q + (L_d - L_q)i_d i_q)$$

where $T_{em}$ is electro-magnetic torque, $n_p$ is pole pairs, $\psi_{pm}$ is permanent magnet flux (constant), $L_d$ is direct-axis synchronous inductance (constant), and $L_q$ is quadrature-axis synchronous inductance (constant).

Harmonic current injection commands may be obtained by any appropriate equation with one example as follows:

$$id = id_0 + \sum_n idc_{6n}\cos(6n\theta) + \sum_n ids_{6n}\sin(6n\theta)$$

$$iq = iq_0 + \sum_n iqc_{6n}\cos(6n\theta) + \sum_n iqs_{6n}\sin(6n\theta)$$

where id, iq are current commands in D, Q axis; $id_0$, $iq_0$ are fundamental current commands in D, Q axis; the cosine and sine terms are harmonic currents commands in D, Q axis; n is the order of harmonics; and θ is rotor angle from rotor position sensor 22 (shown in FIG. 1).

Harmonic components in torque equations reside in $6^{th}$, $12^{th}$, $18^{th}$, and higher multiples of six due to the non-ideality in synchronous machine design. At least one harmonic component is canceled, but harmonic components in any multiple of six may be canceled if desired. The following is an example for canceling $6^{th}$ order harmonic components in reactance/flux in dq frame, i.e. n=1:
where $$id = id_0 + idc_6\cos(6\theta) + ids_6\sin(6\theta)$$
$$= id_0 - \sqrt{a_1^2 + b_1^2}\cos(6\theta - atan2(a_1, b_1) - \pi) +$$
$$\sqrt{a_2^2 + b_2^2}\cos(-6\theta + atan2(a_2, b_2))$$

$$iq = iq_0 + iqc_6\cos(6\theta) + iqs_6\sin(6\theta)$$
$$= iq_0 - \sqrt{a_1^2 + b_1^2}\sin(6\theta - atan2(a_1, b_1) - \pi) +$$
$$\sqrt{a_2^2 + b_2^2}\sin(-6\theta + atan2(a_2, b_2))$$

$$a_1 = \frac{idc_6 + iqs_6}{2}, \quad b_1 = \frac{ids_6 - iqc_6}{2}, \quad a_2 = \frac{idc_6 - iqs_6}{2}, \quad b_2 = \frac{ids_6 + iqc_6}{2}$$

If only the $12^{th}$ and below harmonics components are to be canceled, then $Id_0$, $Iq_0$, $Idc_6$, $Iqc_6$, $Ids_6$, and $Iqs_6$ are calculated to obtain required torque according to the electro-magnetic torque equation by ignoring the higher harmonic components. Any appropriate harmonic current command calculation technique may be used. For one example, see Madani et al., "Reduction of torque pulsations by inductance harmonics identification of a Permanent-Magnet Synchronous Machine," Proceedings of the $4^{th}$ IEEE Conference on Control Applications, September 1995, pages 787-792.

Accordingly, if only harmonic components in flux is considered (that is, $L_d$, $L_q$ are constants) and Id=0 is used in control (rotor flux oriented control), then the following equations may be used:

$$T_{em} = \frac{3}{2}n_p\left[\psi_{pmd0}i_q + i_q\sum_n \psi_{pmd6n}\cos(6n\theta) + 6i_q\sum_n \psi_{pmq6n}\cos(6n\theta)\right] \Rightarrow$$

$$i_q = \frac{2T_{em}}{3np\left[\psi_{pmd0} + \sum_n \psi_{pmd6n}\cos(6n\theta) + 6\sum_n \psi_{pmq6n}\cos(6n\theta)\right]} \approx$$

$$\frac{2T_{em}}{3n_p\psi_{pmd0}}\left[1 - \frac{\cos(6n\theta) + \sum_n (\psi_{pmd6n} + 6\psi_{pmq6n})}{\psi_{pmd0}}\right]$$

Based on the assumption of $$\frac{\sum_n (\psi_{pmd6n} + 6\psi_{pmq6n})}{\psi_{pmd0}} << 1$$

Then, harmonic components of iqcmd are approximately linear to the torque commands and a fixed current shaping technique is feasible. $T_{em}$ is the electro-magnetic torque of a permanent magnet synchronous machine. If only the non-ideality in machine magnet (flux) is considered, that is, machine flux has high order harmonics components, but machine reactance Ld, Lq does not, then the torque equation can be depicted as above. One common control strategy for a permanent synchronous machine is to cause D axis current to be zero and control the machine torque output via Q axis current. With this control strategy, Q axis current commands can be computed as the iq equation above. Furthermore, the non-ideality of machine parameters (herein the high order harmonics components in flux, e.g. $\psi_{pmd6n}$, $\psi_{pmq6n}$) is usually minor compared to main flux (herein $\psi_{pmd0}$). Hence the Q axis current command calculation can be simplified as the terms on the right hand side of the approximation mark above. The sine and cosine terms in current command expressions in the equation above are the harmonics current commands. Id0, Iq0 in the equation above correspond to IdCmd0 60 and IqCmd0 62 respectively in FIG. 3.

Based on the above analysis, one exemplary control scheme includes a feedforward channel to increase the dynamic current response, multiple closed loop channels that involve rotating frame integrators to control the steady state errors at corresponding frequencies or harmonics to zero; and, for each harmonic current, a closed loop regulator for controlling both positive sequence and negative sequence currents in order to suppress torque ripple.

Figure 4:
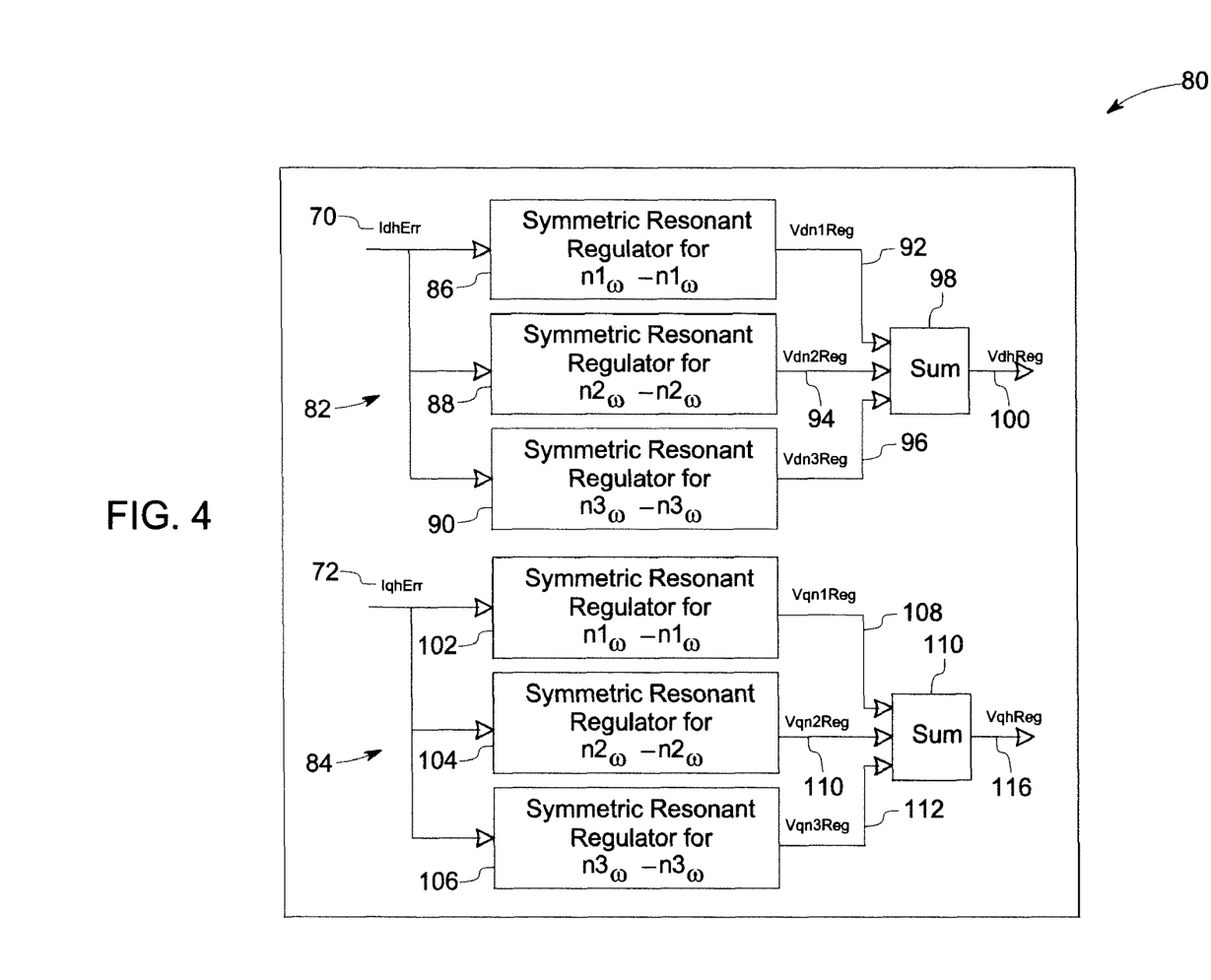
FIG. 4 is a diagrammatic representation of exemplary harmonic current controllers used in the controller of FIG. 3.

FIG. 4 illustrates an exemplary harmonic control embodiment wherein a symmetric resonant regulator 80 is employed as the harmonic current controller. FIG. 4 shows an exemplary implementation of symmetric resonant regulators 82, 84 for D axis and Q axis. The symmetric resonant regulators include multiple frequency regulators shown as n1 ω (86, 102), n2 ω (88, 104), n3 ω (90, 106). These regulators regulate the current to follow the command at different frequencies. Further, the symmetric regulators also include the regulation of both positive sequence (n1 ω, n2 ω, n3 ω) and negative sequence components (−n1 ω, −n2 ω, −n3 ω) of the harmonic current. The outputs include regulated voltages at different frequencies Vdn1Reg, Vdn2Reg, Vdn3Reg (92, 94, 96) for D axis and for Q axis, Vqn1Reg, Vqn2Reg, Vqn3Reg (108, 110, 112) that are respectively summed to give the D and Q axis harmonic voltage commands VdhReg 100 and VqhReg 116.

Figure 5:
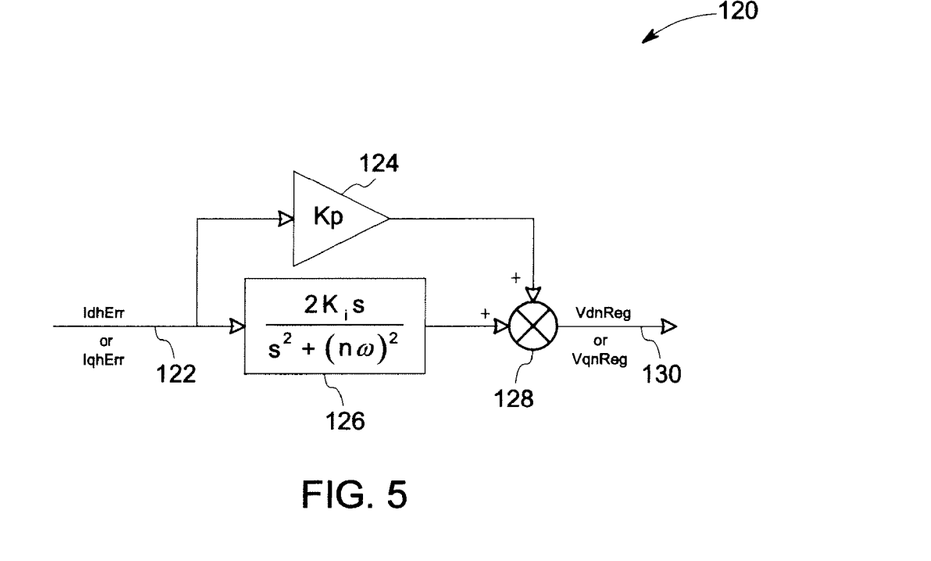
FIG. 5 is a diagrammatic representation of a symmetric resonant regulator used as the harmonic current controller of FIG. 4.
Figure 6:
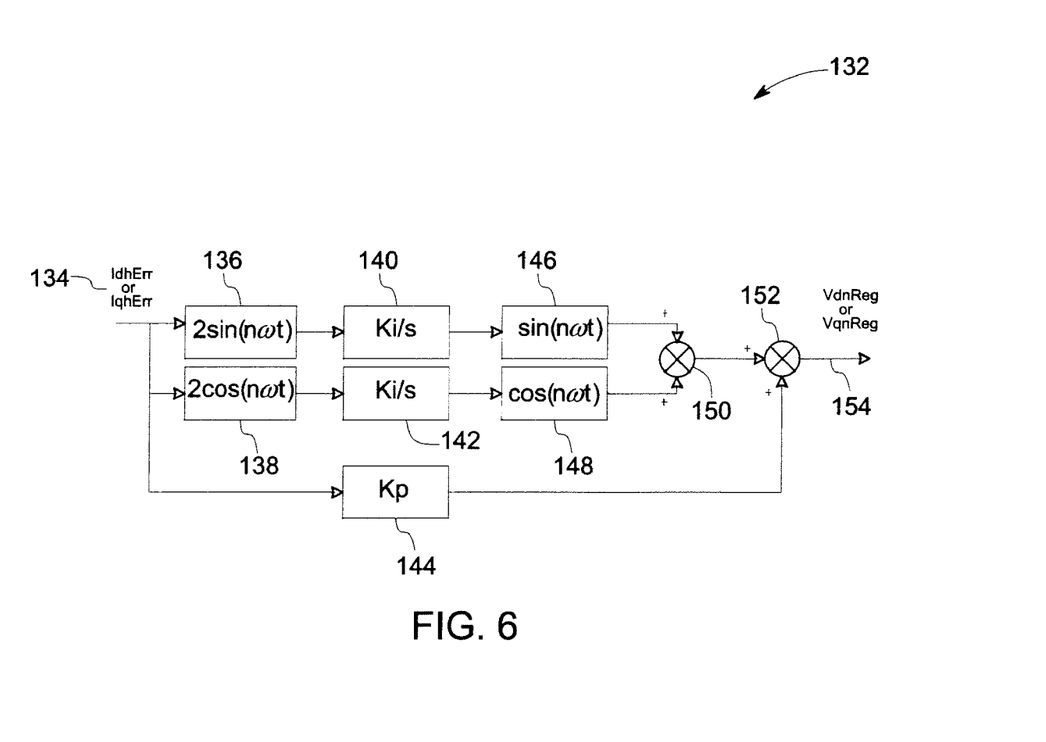
FIG. 6 is a diagrammatic representation of another symmetric resonant regulator used as the harmonic current controller of FIG. 4.
Figure 7:
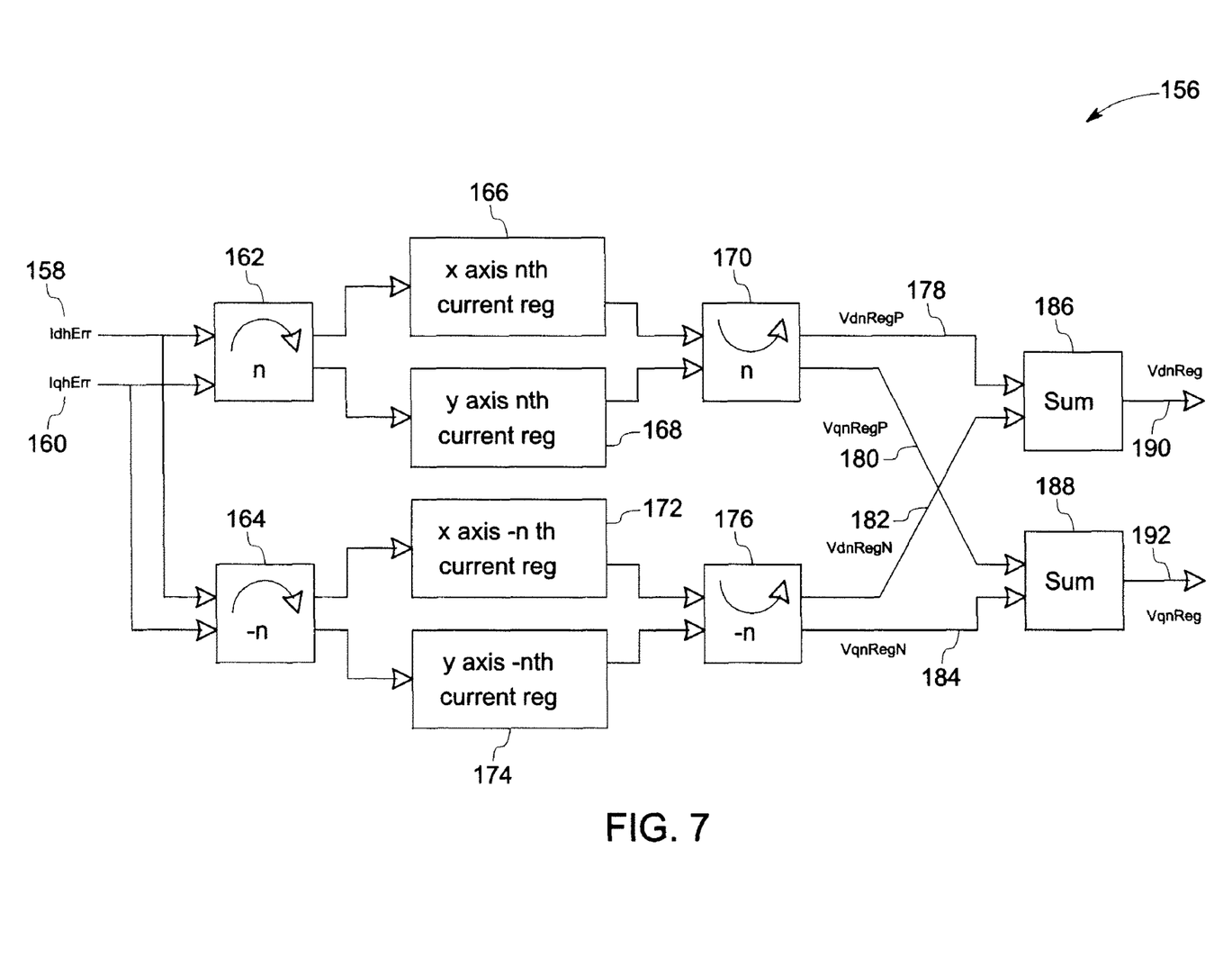
FIG. 7 is a diagrammatic representation of yet another symmetric resonant regulator used as the harmonic current controller of FIG. 4.

FIGS. 5-7 illustrate three different types of symmetric resonant regulators. FIG. 5 shows an exemplary symmetric resonant regulator 120 that includes a proportional term Kp amplifier shown by reference numeral 124 and a resonant integrator depicted by the equation $2K_i s/(s^2+(n\omega)^2)$ as shown by block 126, wherein the resonant integrator 126 controls both positive and negative component error at corresponding frequency (+n ω and −n ω) at the same time. Error 122 needs to be zero at each frequency n ω, for both positive and negative sequence and the output from the blocks 124 and 126 is summed at 128 to provide the regulated harmonic voltage command 130. It may be noted that the resonant integrator is used to control the current error at specified frequency to zero and proportional term amplifier is used to increase system dynamic response. In FIG. 5, each resonant regulator includes a proportional term 124 and a resonant integrator term 126.

FIG. 6 shows another embodiment of a symmetric resonant regulator 132 where a sine channel 136, 140, 146 and cosine channel 138, 142, 148 receive the error signal 134 and are used to control the harmonic component, again for both positive and negative sequence. Output signals of the sine and cosine channels are summed at summation element 150. The proportional term Kp amplifier shown by reference numeral 144 is summed at summation element 154 to provide regulated harmonic voltage command 154. Although FIGS. 5 and 6 each illustrate one resonant regulator for purposes of illustration, two resonant regulators are used in each embodiment (one for D axis and one for Q axis). For one example reference illustrating resonant regulator control, see Wang et al., "Design of Multiple-Reference-Frame PI Controller for Power Converters," 35$^{th}$ Annual IEEE Power Electronics Specialists Conference, June 2004, pages 3331-35.

FIG. 7 shows a third embodiment of a symmetric resonant regulator 156 where the positive and negative errors 158 and 160 are split via elements 162 and 164. Regulators 166, 168 are used to control the positive components of current error in both x and y channels in the n ω rotating frame (similar to D, Q axis channel for fundamental current control). The regulators 172, 174 are for negative frequency components. The output signals of regulators 166, 168, 172, 174 are rotated back to the fundamental frequency based rotating frame (D, Q axis) via blocks 170, 176. Positive voltage commands VdnRegP 178, VqnRegP 180 and negative voltage commands VdnRegN 182, VqnRegN 184 are obtained and then summed at blocks 186 and 188 to provide the regulated harmonic voltage commands VdnReg 190 and VqnReg 192. In the DQ rotating frame, a symmetric resonant controller includes two resonant integral regulators, one for positive components +n ω (such as. blocks 162, 166, 168, 170 in FIG. 7), and the other for negative components −n ω (such as blocks 164, 172, 174, 176 in FIG. 7), wherein each regulator usually includes two channels (x, y channel), and wherein each channel has a proportional term and an integral term, which typically is a PI (proportional integral) regulator.

The various embodiments described herein provide electrical torque ripple control through the power converter current injection that advantageously reduces the acoustic noise of the generator in wind turbine applications. It will be well appreciated by those skilled in the art that the embodiments described herein use the general principle of shaping the current (or voltage) of the generator to reduce torque ripple (and/or acoustic noise). It should also be noted that though wind turbine generators and permanent magnet synchronous generators have been shown in exemplary embodiments, the technique is equally applicable to other generators and motors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine comprising:
   a power converter configured to be coupled to a wind turbine generator and configured to receive converter control signals; and
   a system controller coupled to the power converter, wherein the system controller is configured to supply power and/or torque control signals to the power converter to regulate the fundamental power and/or torque produced by the wind turbine generator, wherein the system controller is further configured to supply harmonic control signals to the power converter to reduce acoustic noise and/or torque ripple generated by the wind turbine generator, and wherein the system controller comprises:
   (i) a fundamental current controller configured for providing fundamental voltage commands,
   (ii) harmonic current controller configured for using harmonic current commands, current feedback signals from the permanent magnet machine, and fundamental current commands in combination with positive and negative sequence regulators to obtain harmonic voltage commands, and
   (iii) summation elements configured for adding the fundamental voltage commands and the harmonic voltage commands to obtain the converter control signals.

2. The wind turbine of claim 1, wherein the harmonic current controller comprises a plurality of symmetric resonant regulators, each symmetric resonant regulator configured for controlling positive and negative sequence harmonic currents at a specific frequency.

3. The wind turbine of claim 2 wherein the harmonic currents comprise at least one of a 6$^{th}$ harmonic current waveform, a 12$^{th}$ harmonic current waveform, and an 18$^{th}$ harmonic current waveform.

4. The wind turbine of claim 2 wherein at least one of the symmetric resonant regulators comprises a proportional term amplifier and a resonant integrator configured for controlling the positive and negative sequence harmonic currents.

5. The wind turbine of claim 2 wherein the symmetric resonant regulators each comprise sine and cosine components configured for controlling the positive and negative sequence currents.

6. A method for controlling torque ripples in a permanent magnet synchronous generator, the method comprising:
   generating a fundamental current command; generating positive and negative sequence signals using a harmonic current command for controlling positive and negative sequence harmonic currents at a specific frequency; and
   obtaining a converter control signal by using the fundamental current command, the harmonic current command, a current feedback signal from the permanent magnet synchronous generator, and the positive and negative sequence signals;
   providing the converter control signal to a power converter coupled to the permanent magnet synchronous generator.

7. The method of claim 6 wherein the harmonic currents comprise at least one of a 6$^{th}$ harmonic current waveform, a 12$^{th}$ harmonic current waveform, and an 18$^{th}$ harmonic current waveform.

* * * * *

UNITED STATES PATENT AND TRADEMARK OFFICE
CERTIFICATE OF CORRECTION

PATENT NO.         : 7,982,326 B2
APPLICATION NO.    : 12/899918
DATED              : July 19, 2011
INVENTOR(S)        : Tan et al.

It is certified that error appears in the above-identified patent and that said Letters Patent is hereby corrected as shown below:

In Column 8, Line 22, in Claim 1, delete "the permanent" and insert -- a permanent --, therefor.

Signed and Sealed this
Tenth Day of July, 2012

David J. Kappos
*Director of the United States Patent and Trademark Office*